United States Patent
Hiemenz et al.

(10) Patent No.: US 8,401,740 B2
(45) Date of Patent: Mar. 19, 2013

(54) ADAPTIVE ENERGY ABSORPTION SYSTEM FOR A VEHICLE SEAT

(75) Inventors: Gregory J. Hiemenz, Silver Spring, MD (US); Curt Kothera, Crofton, MD (US); Norman M. Wereley, Potomac, MD (US)

(73) Assignees: Techno-Sciences, Inc., Calverton, MD (US); University of Maryland, College Park, College Park, MD (US)

( * ) Notice: Subject to any disclaimer, the term of this patent is extended or adjusted under 35 U.S.C. 154(b) by 480 days.

(21) Appl. No.: 12/661,435

(22) Filed: Mar. 17, 2010

(65) Prior Publication Data

US 2010/0179730 A1    Jul. 15, 2010

Related U.S. Application Data

(63) Continuation-in-part of application No. 11/819,875, filed on Jun. 29, 2007, now Pat. No. 7,878,312, and a continuation-in-part of application No. 11/670,773, filed on Feb. 2, 2007, now Pat. No. 7,822,522, and a continuation-in-part of application No. 11/670,761, filed on Feb. 2, 2007, now Pat. No. 7,921,973.

(60) Provisional application No. 61/210,326, filed on Mar. 17, 2009.

(51) Int. Cl.
*B60R 21/015* (2006.01)
(52) U.S. Cl. ............................................................. 701/45
(58) Field of Classification Search .............. 701/45–47; 280/734–735; 180/272–273
See application file for complete search history.

(56) References Cited

U.S. PATENT DOCUMENTS 6,520,535 B1 *   2/2003   Stanley et al. ................ 280/735

* cited by examiner

*Primary Examiner* — Yonel Beaulieu
(74) *Attorney, Agent, or Firm* — Ober, Kaler, Grimes & Shriver; Royal W. Craig

(57) ABSTRACT

An adaptive energy absorption system for a vehicle seat that functions in dual-modes, including a primary mode during severe (shock event) operation and a secondary mode during normal (non-shock event) operation. When operating in primary mode, the present system automatically adjusts a VPEA in real-time to keep loads transmitted to the occupant's body below acceptable injury threshold levels, and can recover to perform said function for multiple shock events. When operating in secondary mode the system reduces vehicle vibration transmitted to the occupant, thereby reducing fatigue and increasing situational awareness.

49 Claims, 9 Drawing Sheets

ADAPTIVE ENERGY ABSORPTION SYSTEM FOR A VEHICLE SEAT

CROSS REFERENCE TO RELATED APPLICATIONS

The present application derives priority from U.S. provisional application Ser. No. 61/210,326 filed 17 Mar. 2009, and is a continuation-in-part of application Ser. No. 11/819,875, filed Jun. 29, 2007 (now U.S. Pat. No. 7,878,312), and is a continuation-in-part of application Ser. No. 11/670,773 filed Feb. 2, 2007 (now U.S. Pat. No. 7,822,522), and is a continuation-in-part of application Ser. No. 11/670,761, filed Feb. 2, 2007 (now U.S. Pat. No. 7,921,973).

BACKGROUND OF THE INVENTION

1. Field of The Invention

The present invention relates generally to energy absorbers and energy absorption systems, and more particularly to shock and vibration energy absorption systems for vehicle seats for mitigating occupant injury due to extreme vehicle movement (e.g., during a vehicle shock event), and/or for mitigating vibration experienced by an occupant of the vehicle seat during normal vehicle operating conditions.

2. Discussion of the Related Art

The minimization of shock load-induced injury is an important issue in seat suspension design. Occupant spinal and pelvic injuries, for example, may result from harsh vertical/crash landings of aircraft, as well as from vertical shock of land and marine vehicles. The severity of resulting spinal, pelvic, or other injuries may be considerably minimized if vehicles are equipped with crashworthy seat designs. A seat suspension system can be used to mitigate the vertical shock loads that are transmitted from the base of the vehicle (or extension thereof), and imparted into the human body. The attenuation of vertical impact forces in vehicle mishaps is one of the prime factors in determining survivability.

Energy absorbers, also known as energy attenuators or load limiters, are a key component of crashworthy seat designs. Energy-absorbing crew seats for helicopter applications, for example, have made significant improvements in helicopter crash survival. Early crashworthy crew seats used fixed-load energy absorbers (FLEAs) to limit the load on an occupant's spine. One drawback associated with these FLEAs, however, is that they were not adjustable and stroked at a factory-established, constant load throughout their entire operating range. Variable load energy absorbers (VLEAs) were designed to address this drawback.

A VLEA enables an occupant to manually adjust the constant stroking load by setting a control (e.g., a dial) to the occupant's weight. The load increases for large occupants, for example, taking advantage of their greater spinal load tolerance to reduce the stroked distance. By contrast, the load decreases for smaller occupants to reduce the risk of injury to their weaker spines. A VLEA enables a seat to deliver the same low-injury risk regardless of occupant weight. VLEAs were developed with a provision so that a wide range of occupants would have equal protection in a crash. An energy absorber load is selected that is proportional to the occupant's weight so that each occupant will experience similar acceleration and use similar stroking space in a crash.

Both FLEAs and VLEAs are known as fixed profile energy absorbers (FPEAs) because they have a constant load-stroke curve. One drawback associated with FPEAs is that they are passive, meaning that they cannot adapt their energy absorption or stroking profiles as a function of occupant weight, or as a function of real-time environmental measurements such as a crash velocity, vibration or shock load. These variables are essential if vibrations and/or impact energy is to be absorbed most efficiently. Seat suspension systems that utilize FPEAs suffer from these and other drawbacks.

In their related U.S. Pat. Nos. 7,878,312 and 7,822,522, the inventors therein describe several variations of an adaptive energy absorption system for a vehicle seat utilizing an adaptive energy absorber or variable profile energy absorber (VPEA) for mitigating injury due to extreme vehicle movement (e.g., during a vehicle shock event), and/or for mitigating vibration, over a wide range of occupant weights and load levels. The adaptive energy absorption system comprises a VPEA, a controller (e.g., a single-mode or multi-mode controller), and one or more sensors for indication and/or measurement of surrounding stimuli, including extreme motion "shock events." The VPEA responds to changing environmental stimuli such as occupant weight, occupant attitude, load level, or other stimuli, to effectively mitigate loads into the occupant's body. During normal operating conditions, for example, the VPEA may be automatically adjusted in real-time to minimize occupant motion based upon a known occupant weight (e.g., automatically sensed or manually adjusted) and known vibration levels (e.g., from sensors). Limiting seat motion provides the advantages of enhancing comfort and reducing fatigue for the occupant of the vehicle seat. During an extreme motion event (e.g., a shock event), motion sensors may trigger the controller into a secondary mode, wherein the VPEA may be automatically adjusted to keep body loads (pelvic loads, spinal loads, etc.) within acceptable levels. An optional fixed profile energy absorber FPEA may also be included, the variable profile energy absorber and the fixed profile energy absorber configured to be in series to mitigate vibration and shock. These disclosed embodiments provide the capability to adapt to tune the system to the harshness of each particular event and adapt to varying shock input levels in real-time using environmental measurements. The co-pending applications provide an advantage over conventional seat energy absorption systems which tend to be tuned for a fixed shock level (thus, not optimally controlling body loads for other shock levels).

VPEA is herein defined as any suitable device used to absorb energy by providing a controlled resistive force applied over a deformation distance without significant elastic rebound, and for which the controlled resistive force can be continuously adjusted over that over a deformation distance. Suitable VPEAs may comprise any of an active valve damper, a magnetorheological fluid damper, an electrorheological fluid damper, a magnetic energy absorber, and a servo-hydraulic actuator. Active valve dampers are pneumatic or hydraulic cylinders that rely on internal valving changes to automatically adjust their damping effect. Active valve dampers with electrically controlled damping constants are known in the art, and typically use variable valve orifices to adjust the damping force.

A magnetorheological fluid damper is a damper filled with magnetorheological fluid, which viscosity is controlled by a magnetic field, usually using an electromagnet. This allows the damping characteristics of the shock absorber to be continuously controlled by varying the power of the electromagnet. Magnetorheological fluid dampers are likewise known in the art and available, for example, from the Lord Corporation of Cary, N.C.

An electrorheological fluid damper is a damper filled with electrorheological fluid, which viscosity is controlled by electric an electric field applied to the fluid. Fludicon GmbH markets various standard and custom electrorheological fluid dampers.

By way of background, ER and MR fluids possess the ability to change properties when electric or magnetic fields are applied there across, respectively. This change is mainly manifested as a substantial increase in dynamic yield stress, or apparent viscosity, of the fluid. ER and MR fluids exhibit nonlinear effects due to applied field, applied loads, strain amplitude, and frequency of excitation in dynamic displacement conditions.

The application of ER & MR fluids to the valve of a damper in the presence of a controllable electric/magnetic field results in the semi-active device known as an ER & MR damper, respectively. A variety of magnetic energy absorbers have been developed and are known in the art including cylindrical-type electromagnetic actuators that use magnetic fields from electromagnets to apply damping to a structure.

A servo-hydraulic actuator employs a hydraulic cylinder-type actuator controlled by a servo motor.

The VPEA responds to changing environmental stimuli such as occupant weight, occupant attitude, load level, or other stimuli, to effectively mitigate loads into the occupant's body. During normal operating conditions, for example, the VPEA may be automatically adjusted in real-time to minimize occupant motion based upon a known occupant weight (e.g., automatically sensed or manually adjusted) and known vibration levels (e.g., from sensors). Limiting seat motion provides the advantages of enhancing comfort and reducing fatigue for the occupant of the vehicle seat. During an extreme motion event (e.g., a shock event), motion sensors may trigger the controller to automatically adjust the VPEA to keep body loads (pelvic loads, spinal loads, etc.) within acceptable levels. In combination with the VPEA, an optional fixed profile energy absorber FPEA may also be included, the VPEA and FPEA being configured in series to mitigate vibration and shock. These disclosed embodiments provide the capability to adapt to tune the system to the harshness of each particular event and adapt to varying shock input levels in real-time using environmental measurements. The co-pending applications provide an advantage over conventional seat energy absorption systems which tend to be tuned for a fixed shock level (thus, not optimally controlling body loads for other shock levels).

The present invention expands the concept by providing the capability of responding to more than one (e.g., repetitive) shock event. The general system components, architecture, and function are the similar and the present system likewise employs an adaptive seat energy absorption system that utilizes a variable profile energy absorber (VPEA) to prevent bodily injury during a shock event. However, the present system employs a dual mode operation. When operating in primary mode during normal operating conditions (non-shock event) the system functions to minimize occupant motion based upon a known occupant weight (e.g., automatically sensed or manually adjusted) and known vibration levels (e.g., from sensors). Limiting seat motion provides the advantages of enhancing comfort and reducing fatigue for the occupant of the vehicle seat. In addition, the present system automatically switches to and functions in secondary mode during severe (shock event) operation, and automatically adjusts in real-time to keep loads transmitted to the occupant's body below acceptable injury threshold levels, and can recover to perform said function for multiple shock events.

SUMMARY OF THE INVENTION

Accordingly, the present invention is an adaptive energy absorption system for a vehicle seat that functions in dual-modes, including a primary mode during normal (non-shock event) operation, and secondary mode during severe (shock event) operation. When operating in primary mode the system reduces vehicle vibration transmitted to the occupant, thereby reducing fatigue and increasing situational awareness. When operating in secondary (shock) mode, the present system automatically adjusts a VPEA in real-time to keep loads transmitted to the occupant's body below acceptable injury threshold levels, and can recover to perform this function for multiple shock events.

The present system employs a VPEA connected between the vehicle seat and a supporting structure such as the vehicle frame.

In addition to the VPEA, a controller is provided (e.g., a single-mode or multi-mode controller), plus one or more sensors in communication with the controller for indicating and/or measuring surrounding stimuli, including extreme motion "shock events." Preferably, a variety of different sensors are provided for measuring, among other things, force, acceleration, velocity, strain, displacement, etc. The sensors may be pre-existing vehicle sensors (e.g., an aircraft altimeter to measure sinkrate). The controller runs control software which monitors the sensor(s) and controls the VPEA in accordance therewith, based on a selectable control profile. Based on the sensor-feedback loop, the control software automatically detects surrounding stimuli, including shock events, and selectively switches between a primary mode in which the control profile reduces vehicle vibration transmitted to the occupant, thereby reducing fatigue and increasing situational awareness, and a secondary mode during severe (shock event) operation in which the control profile keep loads transmitted to the occupant's body below acceptable injury threshold levels. Whilst in secondary mode the system can recover to perform the function for multiple shock events. The operational mode of the system is selected by the controller using measurement signals from at least one sensor, which also allows the system to automatically adjust change mode in real time to one of the two different control profiles, each a function of occupant weight. Moreover, the adaptive energy absorption system may additionally comprise a conventional fixed profile energy absorber (FPEA) and/or a stiffness element (e.g., to supplement VPEA force and aid in vibration isolation) alone or in combination with the VPEA. In one implementation, one or more components of the adaptive energy absorption system may be powered by a power source independent of the vehicle (e.g., via one or more batteries). The independent power source enables the system to continue to function in the event of a loss of vehicle power due to, for example, a shock event, or for any other reason.

According to an aspect of the invention, the VPEA may respond to changing environmental stimuli such as occupant weight, occupant attitude, load level, or other stimuli, to effectively mitigate loads into the occupant's body. During normal operating conditions in primary mode, for example, the VPEA may be automatically adjusted in real-time to minimize occupant motion based upon a known occupant weight (e.g., automatically sensed or manually adjusted) and known vibration levels (e.g., from sensors). Limiting seat motion provides the advantages of enhancing comfort and reducing fatigue for the occupant of the vehicle seat. During an extreme motion event (e.g., a shock event), motion sensors may trigger the controller into its secondary mode, wherein the VPEA may be automatically adjusted to keep body loads (pelvic loads, spinal loads, etc.) within acceptable levels.

One advantage provided by the invention is that the controller may automatically adjust the VPEA in real-time to optimize occupant body loads based on a feedback control algorithm. For example, sensors for measuring VPEA stroke (e.g., Linear Variable Differential Transformers (LVDTs)) as well as accelerometers on the vehicle floor, vehicle seat, and/or occupant helmet (or other wearable article) may provide measurements which are fed back to the control algorithm. The control algorithm may then use this sensor data to maintain body loads (e.g., lumbar force, chest accelerations, etc.) below injury limits.

An additional advantage provided by the invention is the capability to adapt to a varying range of occupants. VPEAs have the ability to vary their load-stroke profile to account for occupant weight. The occupant weight may be determined by a manual setting, or via sensor measurement, and then used to automatically tune the system for the dynamics of the occupant as well as the occupant's injury criteria. Using the occupant weight value, statistical biodynamic data may be used to develop relationships between occupant weight, dynamic parameters, and injury criteria. The controller may use the aforementioned sensor data to determine occupant motion/loads and/or a mathematical biodynamic model (such as a lumped parameter model) to estimate occupant motion/loads in order to determine how to adjust the VPEA to maintain body loads below injury criteria. If a mathematical biodynamic model is utilized, dynamic parameters may be automatically updated based upon the occupant weight. Alternatively, the controller may use a gain schedule to adjust the VPEA in a pre-determined manner for given set parameters such as motion, weight, injury criteria, etc.

Yet another advantage provided by the invention is the capability to adapt to varying shock input levels. Real-time environmental measurements may be used to tune the system to the harshness of each particular event. This is an advantage over conventional seat energy absorption systems which tend to be tuned for a fixed shock level (thus, not optimally controlling body loads for other shock levels).

Still yet another advantage provided by the invention is that real-time feedback control may be used to optimally control the VPEA to mitigate vibration due to normal vehicle operation, thereby enhancing comfort and reducing fatigue for the occupant. In one implementation, the same controller used for shock control may be utilized for vibration control. Alternatively, a multi-mode controller may be used that minimizes occupant vibration during normal operation, and then switches to a shock control mode during an extreme motion event. Once an extreme motion event is measured, the controller may switch to a shock control mode to prevent occupant injury.

According to a further aspect of the invention, various configurations of dual-goal energy absorption apparatuses that enable both shock mitigation and vibration isolation are disclosed in detail herein. As noted above, in one implementation, the VPEA may be automatically adjusted in real-time to keep body loads (pelvic loads, spinal loads, etc.) within acceptable levels during a vehicle shock event (or other extreme motion event). For implementations wherein vibration isolation is desired, a stiffness element (e.g., a coil spring) may be introduced into the system to reduce the system fundamental resonance and to rebound the VPEA. In shock mitigation design, however, a stiffness element is undesirable because it stores energy and provides a potentially injurious or even lethal rebound reaction into the occupant. These conflicting design requirements have previously provided a formidable challenge to the utilization of one energy absorber for both shock mitigation and vibration isolation. Accordingly, to address this and other challenges, various dual-goal energy absorption apparatuses are disclosed that provide suitable stiffness for vibration isolation, whereas, in extreme motion events, the stiffness is removed. Although these dual-goal energy absorption apparatuses are described herein in the context of an adaptive energy absorption system for a vehicle seat, it should be recognized that they may be utilized in a variety of other applications without limitation.

The adaptive energy absorption system, as described herein, may be used with any type of vehicle seats including, but not limited to, aircraft seats, land vehicle seats, marine vehicle seats, or seats for other vehicles that may experience vertical (or other) shock loads (whether it be a one-time event or repetitive shock), or that may be exposed to varying levels of vibration during normal operating conditions. In various implementations, the adaptive energy absorption system may be integral with a vehicle seat, or retro-fit to existing vehicle seats.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to preferred embodiments of the present invention, examples of which are illustrated in the accompanying drawings. Wherever possible, the same reference numbers will be used throughout the drawings to refer to the same or like parts.

An adaptive energy absorption system is disclosed for use with any type of vehicle seats including, but not limited to, aircraft (e.g., rotorcraft, fixed wing, etc.) seats, land vehicle seats (e.g., seats for heavy-duty military, agricultural, and construction vehicles, etc.), marine vehicle seats, or seats for other vehicles that may experience vertical (or other) shock loads, or that may be exposed to varying levels of vibration during normal operating conditions.

Figure 1:
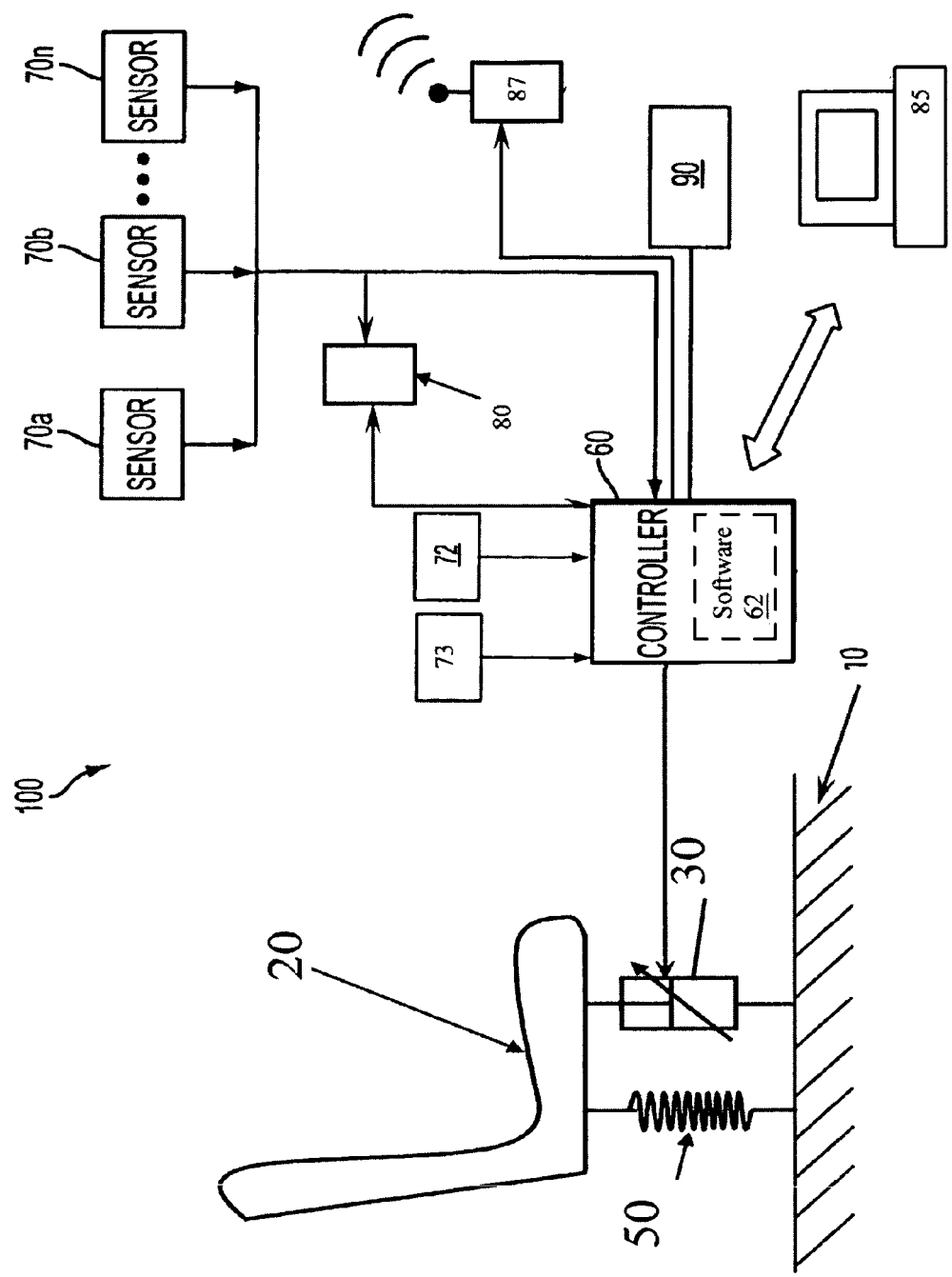
FIG. 1 is an exemplary illustration of an adaptive energy absorption system for a vehicle seat, according to an embodiment of the invention.

With particular reference to FIG. 1, an adaptive energy absorption system 100 is provided for shock and vibration absorption to a vehicle seat 20. Vehicle seat 20 may comprise an existing vehicle seat, and one or more of the components of system 100 (as disclosed herein) may be retrofit to vehicle seat 20. Alternatively, vehicle seat 20 along with one or more components of system 100 may be provided together as an integral system for original installation in a vehicle.

In accordance with the present invention, a variable profile energy absorber (VPEA) 30 is operatively connected to vehicle seat 20, and to a base 10 which may be a supporting structure of the vehicle (such as the vehicle frame or extension thereof).

In a preferred embodiment, a stiffness element 50 such as a spring, passive pneumatic or hydraulic cylinder or other FPEA, is operatively connected, preferably in parallel, between the vehicle seat 20 and the supporting structure of the vehicle for both shock mitigation and vibration isolation, as well as to recoil or rebound the system in preparation for subsequent shock event(s). VPEA 30 operates in conjunction with stiffness element 50. Although the stiffness element 50 may have a fixed stiffness profile and may operate as a passive element, it may alternatively have a variable stiffness profile and function as a semi-active, or active element as described below.

System 100 further comprises a programmable controller 60 capable of operating in at least a single mode (a secondary extreme motion mode), but more preferably operable in multi-mode (or dual modes) including a primary vibration control mode and the secondary extreme motion mode. Controller 60 includes memory for storing and running control software 62 that automatically adjusts VPEA 30 in real-time to an optimal setting based on feedback from a weight indication mechanism 72 and/or one or more sensors (70a, 70b, ... 70n) which will be described in detail below. One or more components of system 100 may be powered by a power source 90, as described in greater detail below, and one skilled in the art should understand that a single controller 60 may be used to control multiple VPEA 30-equipped seats 20.

As a general overview, VPEA 30 responds to changing environmental stimuli such as occupant weight, occupant attitude, load level, or other stimuli, to effectively mitigate loads into the occupant's body. According to a basic implementation of the invention, controller 60 may operate only in a secondary mode to mitigate injury to an occupant of vehicle seat 20 when an occurrence of a vehicle shock event (or other extreme motion event) is determined.

In a preferred implementation, controller 60 may be used to adjust VPEA 30 for purposes of both vibration isolation and shock mitigation. For example, during normal (vehicle) operating conditions, controller 60 may operate in a first (primary) mode to automatically adjust VPEA 30 in real-time to minimize occupant motion based upon a known occupant weight (e.g., automatically sensed or manually adjusted) and/or known vibration levels (e.g., from sensors). Limiting motion of vehicle seat 20 provides the advantages of enhancing comfort and reducing fatigue for the occupant of vehicle seat 20. During an extreme motion event (e.g., a vehicle shock event), motion sensors may trigger controller 60 into a secondary mode, wherein VPEA 30 may be automatically adjusted to keep body loads (pelvic loads, spinal loads, etc.) within acceptable levels.

Prior to describing the various control strategies that may be implemented for vibration isolation and/or shock mitigation, an explanation of the one or more components that may comprise system 100 (FIG. 1) will now be provided. It should be recognized, however, that one or more of the components of system 100 (depicted in FIG. 1) may or may not be present (or may be present in various configurations) in different implementations of the invention, depending on whether system 100 is utilized for vibration isolation and/or shock mitigation. Accordingly, the depiction of system 100 in FIG. 1 is exemplary only, and should not be viewed as limiting. Additional configurations of system 100 will be described below and illustrated in the accompanying drawing figures.

Power Source 90.

According to an aspect of the invention, one or more components of system 100 may be powered by a power source 90. In one implementation, power source 90 may comprise a power source associated with the vehicle. Alternatively, power source 90 may comprise a source (e.g., one or more batteries) independent of the vehicle so as to enable system 100 to continue to function in the event of a loss of vehicle power due to, for example, a shock event, or for any other reason. According to yet another alternative implementation, one or more components of system 100 may be powered by a power source associated with the vehicle, while power source 90 serves as a "back-up," independent power source which will activate upon a loss of vehicle power. Other configurations may be implemented.

Sensors 70a, 70b, ... 70n.

Figure 10:
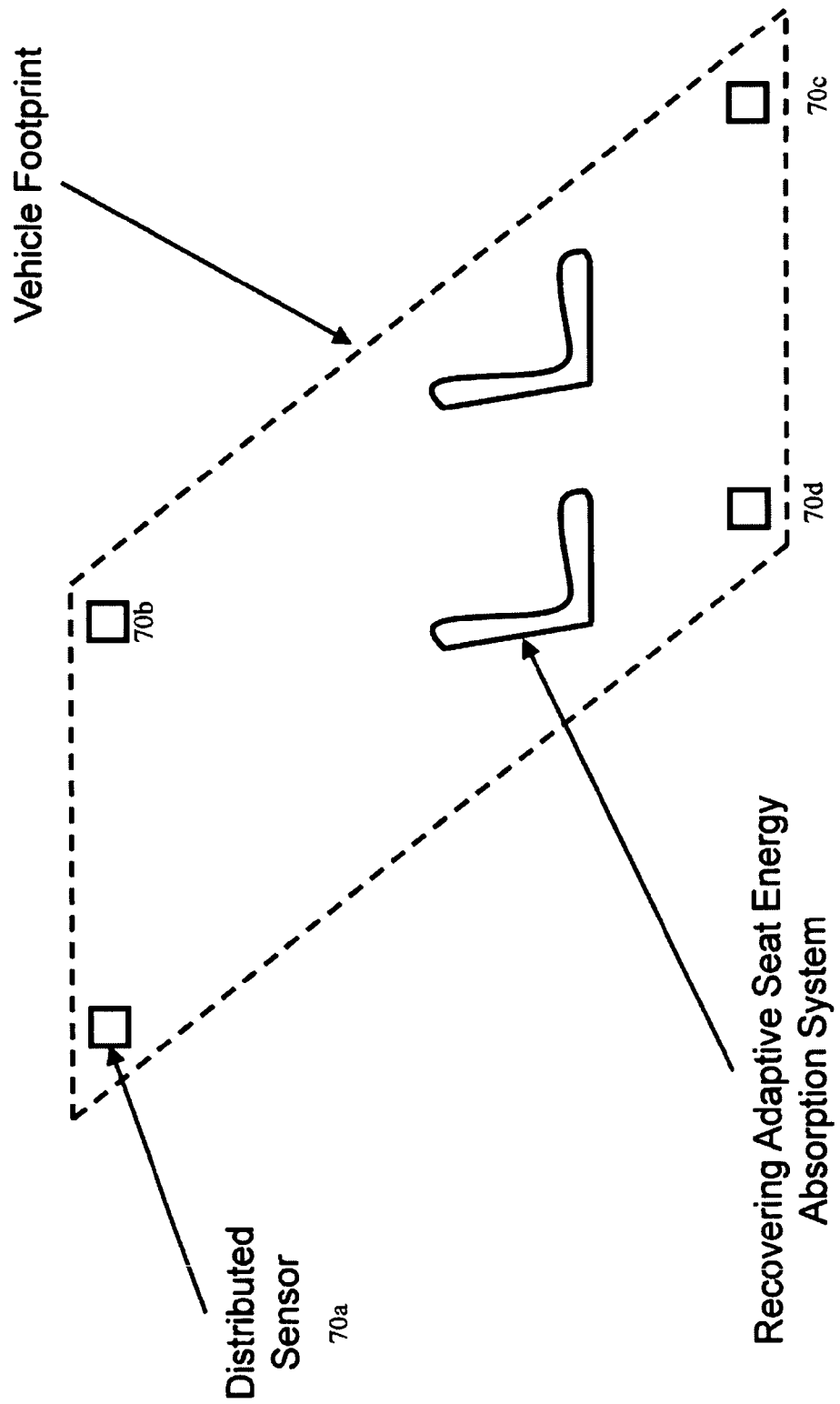
FIG. 10 illustrates an array of sensors (70a, 70b, . . . 70n) distributed throughout the vehicle near locations of high probability of shock onset.

According to an aspect of the invention, to control VPEA 30, one or more sensors (70a, 70b, ... 70n) may be provided for indication and/or measurement of surrounding stimuli, including extreme motion "shock events" and/or real-time motion information. For example, in one implementation, at least one sensor may be provided on vehicle seat 20, and one sensor may be provided on base 10 of the vehicle (e.g., on the floor of the vehicle, or on a platform or other structure to which vehicle seat 20 may operatively connected) so that the input load levels as well motion of the occupant (both absolute & relative) may be determined. Depending on the design of the control system, sensors (70a, 70b, ... 70n) may measure force (e.g, load cells), acceleration (e.g., accelerometers), velocity (e.g., PVTs, etc.), strain/displacement (e.g., LVDT, strain gauge, etc), deformation (e.g., a frangible wire or fiber-optic line that, when broken or bent, indicates the onset of shock, and optionally measuring it), vehicle position, and/or vehicle attitude. In some implementations, one or more of sensors (70a, 70b, ... 70n) may comprise, or interface to, existing vehicle sensors (e.g., an aircraft altimeter to measure sinkrate). As seen in FIG. 10, sensors (70a, 70b, ... 70n) may be distributed throughout the vehicle near locations of high probability of shock onset, such as front or rear crumple zones, or at the four corners of the vehicle footprint (as shown) in an effort to enable sufficient time for the controller 60 to adjust, via a control signal, the adaptive energy absorption system prior to the shock event actually reaching the vehicle seat 20 and occupant, thereby establishing a type of preview control.

In a preferred embodiment, a weight indication mechanism 72 is also used to obtain an occupant's weight (or mass) to tune the system to the occupant. Although weight indication mechanism 72 may comprise a manual control for enabling an occupant to manually select his or her weight, a weight sensor is preferably positioned on vehicle seat 20. Weight sensor 72 may be a strain gauge or other like mechanism for obtaining the weight of an occupant of vehicle seat 20.

In addition to occupant weight, other sensor(s) 73 for determining occupant position and/or attitude within vehicle seat 20 may also be provided. For example, one or more PVDF sensors in (or associated with) vehicle seat 20 may be used to measure occupant center of gravity (CG). An array of proximity/position sensors in (or associated with) vehicle seat 20 may be used to determine body position, and an array of force or strain sensors in (or associated with) the structure of vehicle seat 20 may also be utilized to measure occupant CG. Additional implementations exist.

In one implementation, one or more of sensors (70a, 70b, . . . 70n) may be body-mounted such as, but not limited to, those mounted on a helmet, clothing, etc. of the occupant of vehicle seat 20 to measure real-time body loads.

Due to the numerous configurations and possible placement positions of one or more sensors (70a, 70b, . . . 70n), they have been illustrated generally in FIG. 1. Various other types of sensors may be implemented as would be appreciated by those having skill in the art.

Controller 60.

As known and understood by those having skill in the art, controller 60 may comprise a processor, as well as a memory for storing control software 62 which comprises one or more control algorithms for execution by the processor. The memory also stores data that may be used and/or produced by execution of the one or more control algorithms. Controller 60 interfaces with, and receives measurement signals (controller inputs) from, one or more sensors (70a, 70b, . . . 70n) and/or weight indication mechanism 72 and/or sensor(s) 73. Based on processing performed, controller 60 interfaces with, and generates one or more control signals (controller outputs) to control one or more components of system 100 (e.g., VPEA 30).

According to one implementation, controller 60 may comprise a single-mode controller that may operate only in a mode to mitigate injury to an occupant of vehicle seat 20 when an occurrence of a vehicle shock event (or other extreme motion event) is determined. Even where controller 60 is a single-mode controller, it may still function both to minimize vibration and optimize body loads during a vehicle shock event using common software 62 implementing a single software method. However, the present invention contemplates a fundamentally different cause-effect feedback loop for these two different types of operation, which requires fundamentally different software control, and so the preferred embodiment of the invention automatically adapts, switching from primary vibration control mode to extreme motion control mode when a severe shock event is detected. This is what is intended by 'dual-mode' or "multi-mode" controller 62.

More specifically, controller 60 preferably comprises a dual-mode controller having a first control mode (which may be referred to herein as a primary normal or vibration control mode), and a secondary control mode (which may be referred to herein as a shock control mode). Again, a single controller 60 may be used to control multiple VPEA 30-equipped seats 20. Each of the modes of controller 60 are discussed in greater detail below.

Variable Profile Energy Absorber (VPEA) 30.

According to an aspect of the invention, VPEA 30 may comprise any VPEA that can modify its energy absorbing capabilities as commanded by a feedback control system. Examples of such devices are noted above. Using feedback control, these dampers may adjust the load profile as vehicle seat 20 strokes, for example, during a crash or other vehicle shock event.

MR and ER fluid dampers, in particular, are advantageous because they are able to achieve what is effectively an infinitely adjustable profile energy absorber, as described below. MR fluid dampers, in particular, are advantageous in that they are easily powered by a DC electrical supply (e.g., battery) which facilitates the provision of an independent power source (e.g., power source 90), as described above.

Figure 2A:
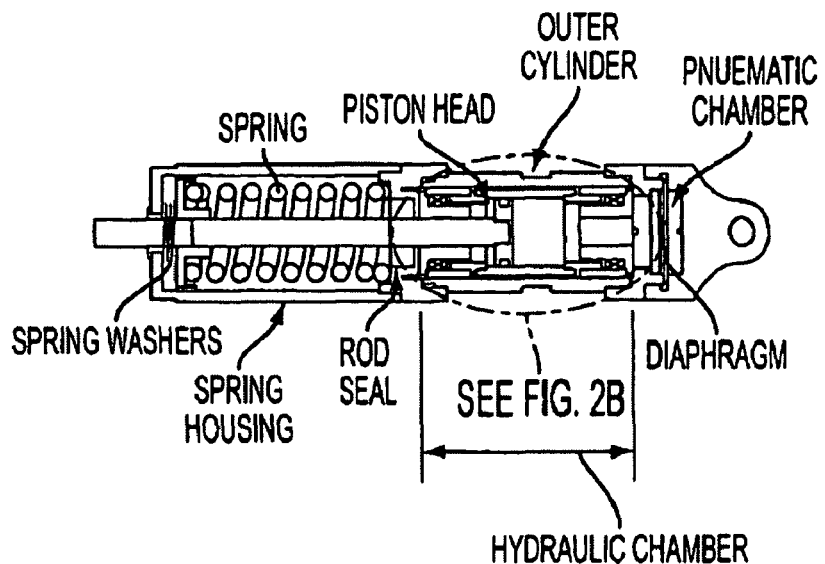
FIG. 2 is an exemplary illustration of a sample MR damper design.
Figure 2B:
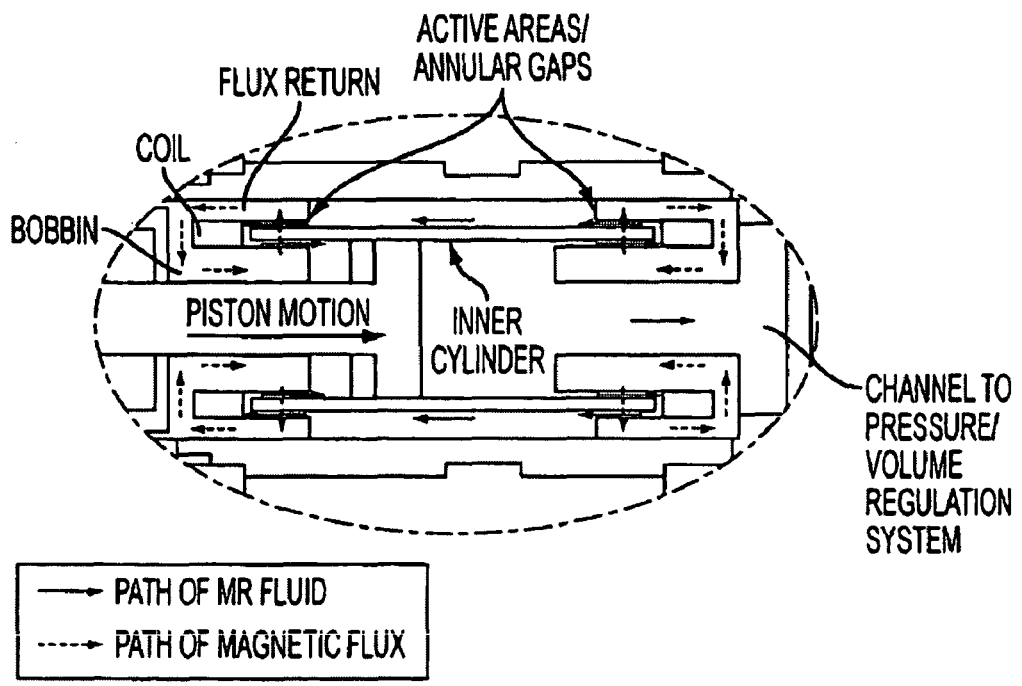
Figure 3:
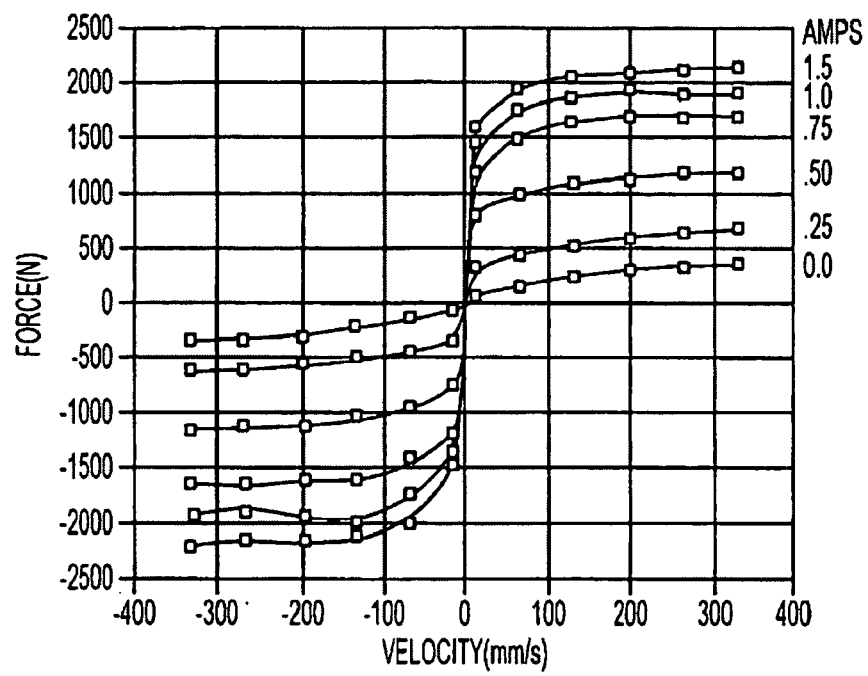
FIG. 3 is an illustration of a graphical view showing force v. velocity with respect to damping at various applied currents.

FIG. 2 (A&B) is an exemplary illustration of a suitable MR damper design found in U.S. Pat. No. 6,694,856 B1 (issued Feb. 24, 2004), entitled "MAGNETORHEOLOGICAL DAMPER AND ENERGY DISSIPATION METHOD" to Chen et al., which is hereby incorporated by reference herein in its entirety. An explanation of the operation of an MR damper will not be provided herein, as MR dampers are known and understood by those having skill in the art. FIG. 3 illustrates representative test data obtained from a COTS Lord Rheonetics™. damper showing the force vs. piston velocity behavior as a function of applied field. As depicted, the damper force can be broken into two regimes, preyield and postyield. The preyield portion tends to be fairly rigid and is often approximated as Coulomb damping, while the postyield is plastic and is often approximated as viscous damping.

Figure 4:
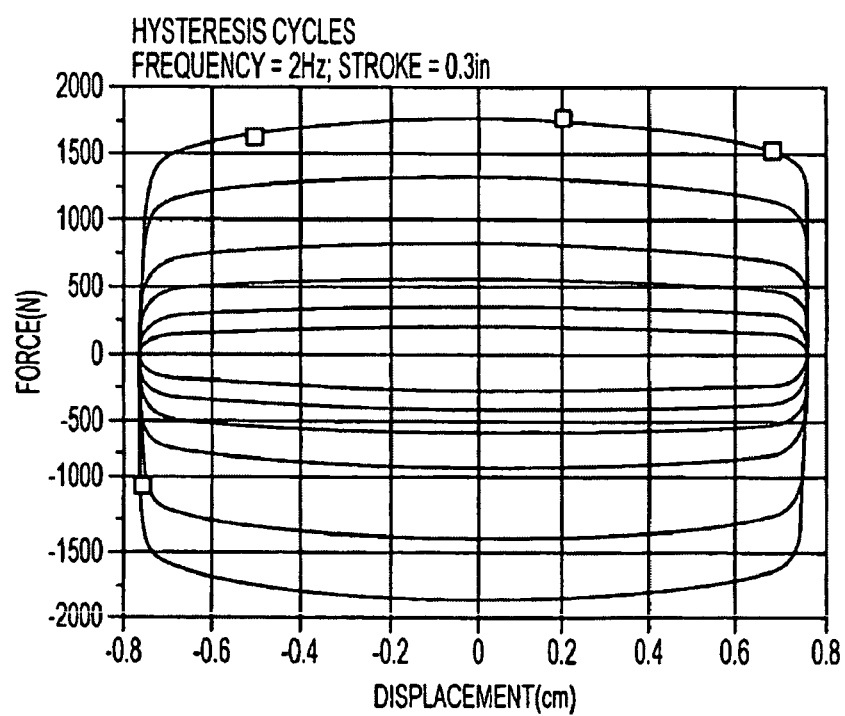
FIG. 4 is an illustration of a graphical view of hysteresis cycle with respect to displacement.

FIG. 4 illustrates representative force vs. piston displacement behavior for an MR damper. The total energy dissipated by the damper is represented by the area within the depicted hysteresis curves. As the applied field is increased, the hysteresis loop increases in size, thereby increasing the amount of energy that can be dissipated by the damper.

Figure 5:
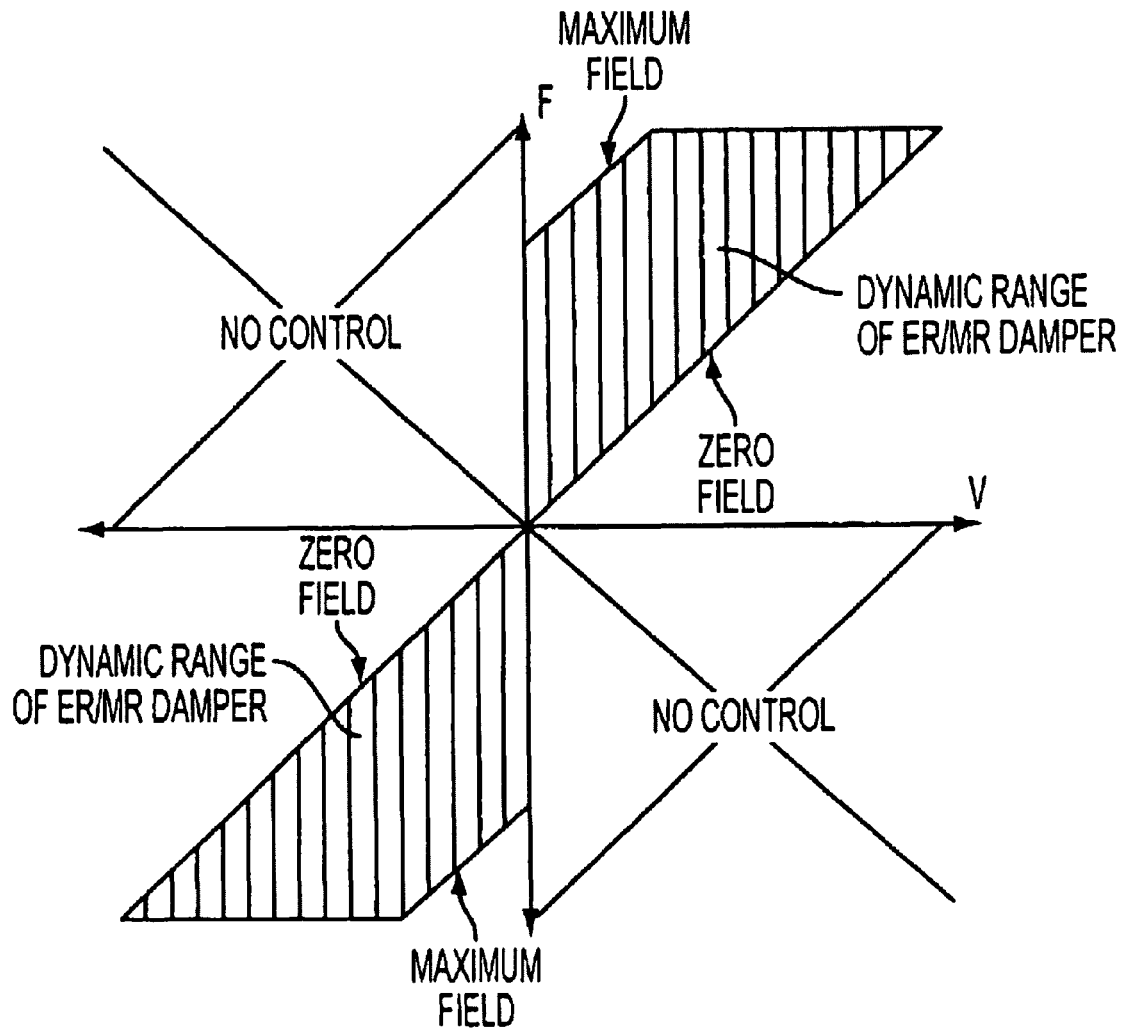
FIG. 5 is a graphical view of a dynamic range of an adjustable damper which may be controlled.

Like all semi-active devices, ER and MR dampers are purely dissipative. That is, there is only control authority when the desired force and the relative velocity are of the same sign. More specifically, ER and MR dampers have a dynamic range limited by the field-off and maximum field cases as shown in FIG. 5.

Based upon design considerations including, but not limited to, occupant weight range, design load levels, geometric restrictions, etc., one or more VPEAs 30 may be utilized in system 100, and their arrangement may vary. Multiple VPEAs 30 may be implemented in parallel, for instance, to increase the capacity. Using multiple VPEAs may also enable the use of smaller devices rather than one larger device. Additionally, arranging VPEAs in a diagonal configuration may be beneficial in maximizing stroke when vertical space is limited.

Stiffness Element 50

According to an aspect of the invention, system 100 may further comprise one or more stiffness or "spring" elements 50 operatively connected between the vehicle 10 and the seat 20. The stiffness element 50 operates passively, semi-actively, or actively, and may have a fixed or variable stiffness profile. Examples of stiffness element 50 may include, but are not limited to, coil springs, leaf springs, visco-elastic material, or any spring or spring system having a natural harmonic frequency which, when a vibration frequency is applied, will resonate. Stiffness element 50, if used, may be implemented such that it provides a tuned stiffness for vibration control (preferably soft to reduce transmissibility). The tuning of this stiffness is important because its use may sacrifice some stroke of the VPEA 30 energy absorber(s) during a shock event. Use of a variable stiffness spring (vs. fixed stiffness) may be advantageous because it would enable tuning to varying occupant masses. The stiffness spring 50 may be variable, adjusted by a manual control mechanism (e.g., a dial), or automatically adjusted based upon an occupant mass measurement. In addition, according to the present invention, the stiffness element 50 performs a recoil and recovery function to return the suspension system 30 to substantially its initial position. The recoil function returns the VPEA 30 to substantially its initial position after a first shock event quickly enough to perform its function for a subsequent shock event. The recovery function controls the recoil in such a way that the suspension system 30 does not experience an extensional end-stop impact, and so that the system does not oscillate undesirably. One example of a method for quickly returning the suspension system to its initial position without oscillation is to adjust the force level of the VPEA to provide substantially critical equivalent viscous damping during stroke recovery, though other methods and approaches may be suitable.

The combined recoil/recovery function may be passive, implemented only by the resilient properties of the stiffness element 50. However, the recoil/recovery function may also be active, entailing a feedback loop for coordinated control of the VPEA 30 and stiffness element 50. For example, as the controller 60 detects the occurrence of a first shock event (from a sensor), the magnitude of a second immediate shock event may be estimated based on prior collected sensor measurement data (e.g., severity of the first shock event). After the stiffness element 50 recovers the VPEA 30 substantially to its initial condition, the controller 60 may communicate with the VPEA 30 via a control signal to mitigate the anticipated transmission of loads to the seat occupant at the predicted second shock level. This sequence may be repeated as needed. Once the occurrence of shock events has ceased, the controller 60 may then return the VPEA 30 to the primary operational mode for vibration isolation.

Data Logger 80

Referring back to FIG. 1, a data logger 80 may be provided to store and record information related to the shock and/or vibration such as measurements thereof. The data logger 80 may be connected directly to the sensors 70a-70n to log the sensor data in internal memory for later download to a computer. There are a variety of conventional data loggers that will suffice for this purpose, including DATAQ™ Instruments line of Data Logger products for Stand-alone and PC connected Applications. The data logger may also be embedded into the controller 60 itself, whereas the controller's microprocessor stores the sensor data or processed sensor data (i.e., filtered, mathematical operations, etc.) onto onboard memory, such as internal microprocessor memory, an on board hard drive, or other onboard memory (i.e, removable or non-removable solid state memory, removable media, etc). The data logger 80 and/or removable memory/media may also be connected to the controller 60 and/or in communication with a remote host computer 85 for analysis, evaluation, and/or storage of the data. For example, the data may be analyzed to provide a vehicle and/or personnel dosimetry capability, in which logged shock and/or vibration data is used to keep record of vehicle and/or vehicle occupant exposure for health/maintenance purposes. The controller 60 may be programmed to compare sensor data to predetermined thresholds to determine shock events and/or vibration exposure exceeding defined limits.

The controller 60 may in turn be in communication with remote host computer 85, display console, or other device 85, or may emit cellular or RF wireless signals as event notifications. For example, the controller 60 may send remote host computer 85 a shock event notification, or an over-limit notification, wherein an identifiable indication that a system sensor 70a . . . n has measured an event over a preset limit has occurred. The controller 60 may also signal such notifications over a connected audio and/or visual alarm 87. The controller 60 may also send remote host computer, display console, or other device 85 a failure alarm, e.g., an identifiable indication that at least one component of the adaptive seat energy absorption system 100 is not working properly. All sensor and communication signals can be carried through wires, wirelessly, or any combination thereof.

Control Strategies.

Having provided an explanation of the one or more components that may comprise system 100 (FIG. 1) as well as the alternative design configurations thereof, examples of various control strategies for vibration isolation and/or shock mitigation will now be discussed.

Figure 6:
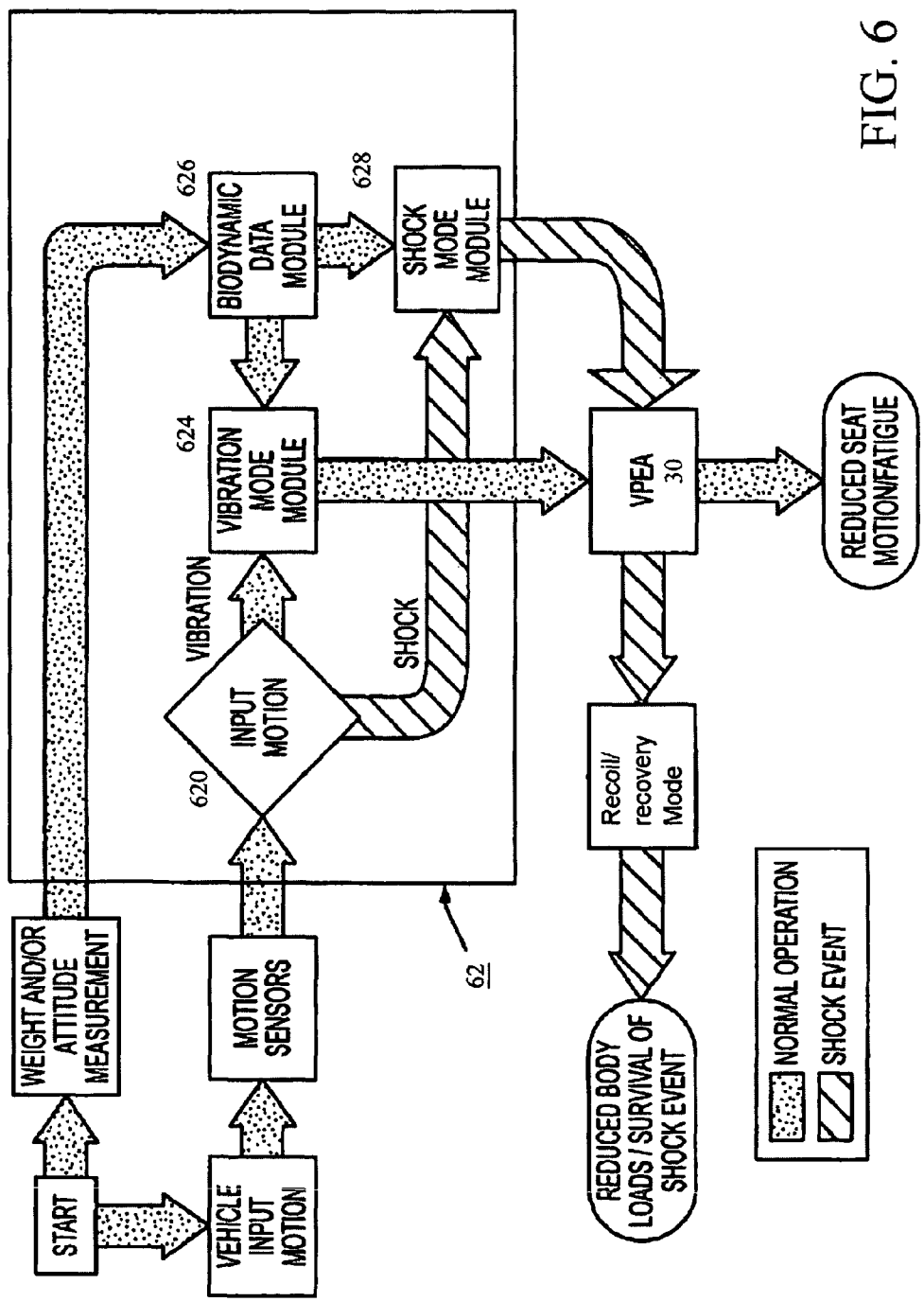
FIG. 6 is an exemplary illustration of a control-flow diagram, according to an aspect of the invention.
Figure 7:
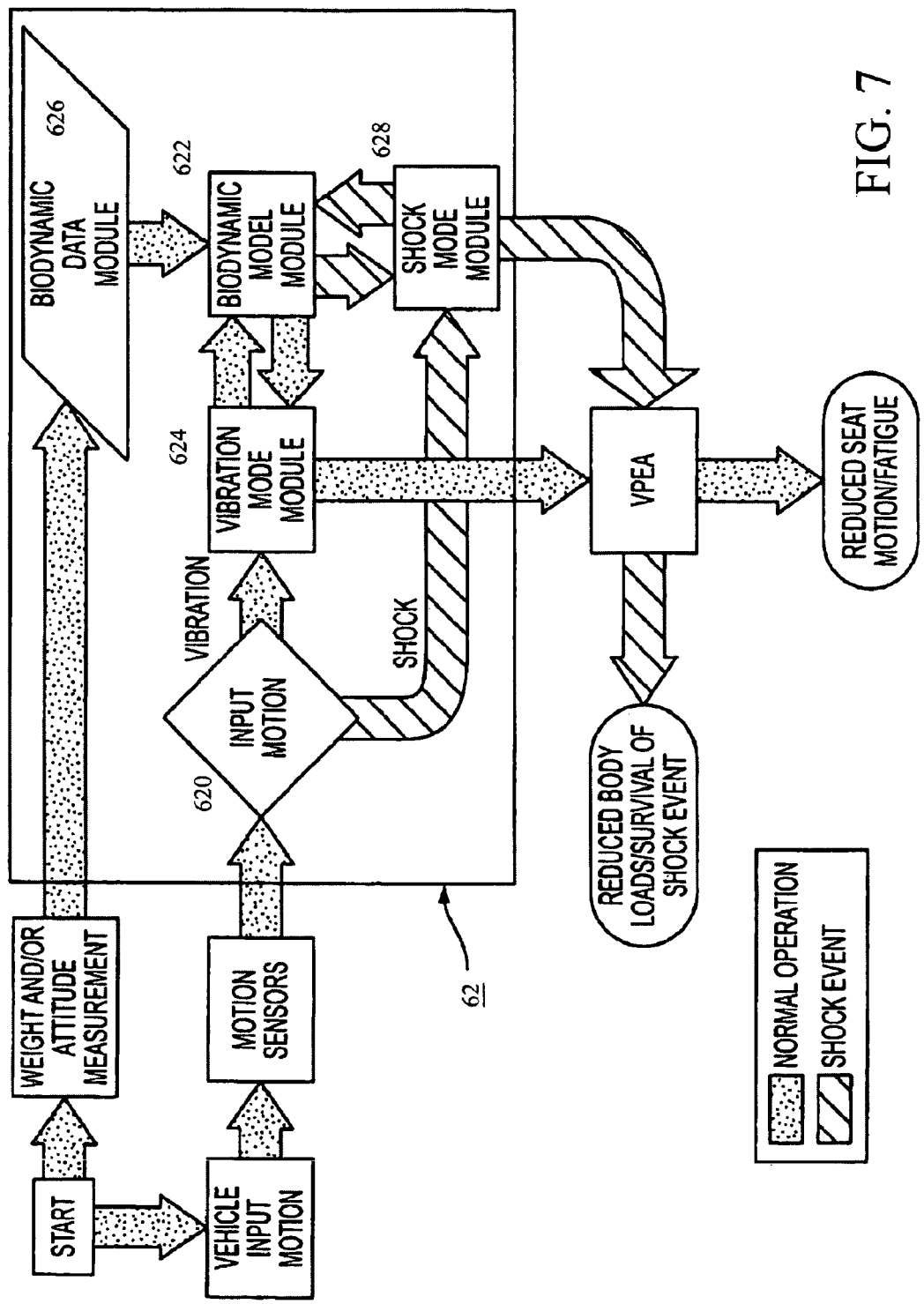
FIG. 7 is an exemplary illustration of a control-flow diagram, according to an aspect of the invention.
Figure 8:
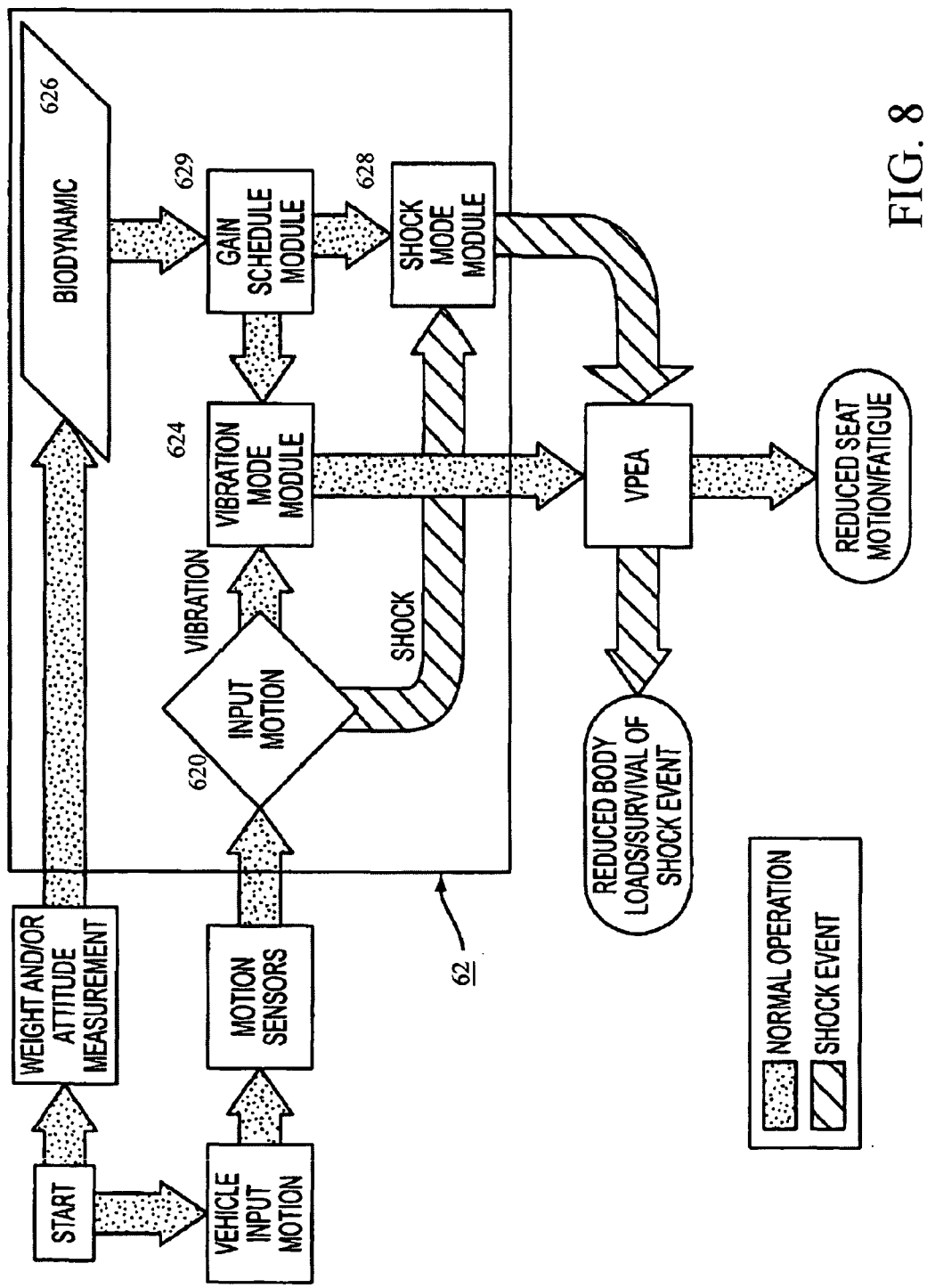
FIG. 8 is an exemplary illustration of a control-flow diagram, according to an aspect of the invention.

FIGS. 6-8 are exemplary control-flow diagrams for various implementations of the invention, wherein controller 60 operates as a dual-mode controller having a first control mode (e.g., a normal or vibration control mode), and a second control mode (e.g., a shock control mode). In the first (primary) control mode, controller 60 may function to provide vibration isolation during normal vehicle operation, and may automatically switch to second (secondary) control mode to mitigate (or prevent) bodily injury to an occupant of vehicle seat 20 during a vehicle shock event, in real time based on signals from sensors (70a, 70b, . . . 70n) measuring surrounding stimuli that indicate extreme motion "shock events".

Specifically, FIG. 6 is an exemplary illustration of a control flow diagram for the system 100 inclusive of control software 62 of FIG. 1 (and method), wherein controller 60 comprises a dual mode controller and supplies a different control to the VPEA 30 depending on whether the inputs are indicative of normal vehicle operation, or a shock event. In this implementation, control software 62 in controller 60 may comprise one or more of a motion determination module 620, vibration mode module 624, biodynamic model module 626, shock mode module 628, or other modules, each of which may enable the various functions that aid in vibration isolation and/or shock mitigation. One or more of the foregoing controller modules 620-628 may be combined. For some purposes, not all modules may be necessary.

According to an aspect of the invention, in operation, controller 60 receives real-time vehicle motion information via measurement signals (controller inputs) from one or more sensors (70a, 70b, . . . 70n) as described in detail above. Controller 60 may also receive occupant weight from weight indication mechanism 72 (manual control, weight sensors, or like mechanisms). In some implementations, controller 60 may utilize a fixed occupant weight value (e.g., the weight for a 50th percentile male) selected from any number of biodynamic data sources. Controller 60 may also receive attitude measurements via measurement signals (controller inputs) from one or more occupant attitude sensors.

Based on the real-time vehicle motion information received as inputs, a motion determination module 620 determines whether the vehicle is operating under normal conditions, or whether a shock event (or other extreme motion event) is occurring. This determination is made by comparing one or more motion or load measurements (e.g., acceleration, force, etc.) to one or more predetermined values (or thresholds). If one or any combination of sensors (70a, 70b, . . . 70n) measure motion or loads beyond one or more specified thresholds, then controller 60 may enter a shock control mode. Otherwise, controller 60 may remain in a normal (or vibration) control mode. Threshold values may, for example, comprise values just above maximum amplitudes expected during normal vehicle operation. Exemplary acceleration profiles for "shock" events may be approximated by pulses such as, but not limited to: (a) triangle, (b) half-sine, (c) square, and (d) combinations thereof.

In the normal (or vibration) control mode, a vibration mode module 624 (of controller 60) may control the VPEA 30 so as to minimize the vibrational motion (e.g., absolute motion or relative motion) of vehicle seat 20, or to minimize the motion of a body part of the occupant (e.g., head, hands, chest, pelvis, etc.). This may be done by isolating seat 20 and reducing motion transferred from the vehicle to seat 20 (e.g., reduce transmissibility). The inclusion of a stiffness element 50 allows the seat resonance to be reduced much lower than the vibration excitation input, thereby attaining vibration isolation. The inclusion of a variable stiffness element 50 allows the seat resonance to be tuned within a range. The VPEA 30 may then be controlled to actively or semi-actively reduce that resonance while maintaining high frequency isolation. Minimizing the motion of the occupant during normal operation will assist in enhancing comfort and reducing fatigue.

In one implementation, controller 60 may utilize a "Skyhook" control method wherein, for example, the VPEA 30 is turned on to a desired force, $F_{des}$, when the absolute velocity of the suspended mass (i.e., the vehicle seat), M, is the same sign as the relative velocity between the suspended mass and the base, (M-Mo). This is denoted mathematically as: $F_{VPEA} = \{F_{des}, \text{ if } V_M > V_{REL(M-Mo)}\}$, $FVPEA = \{0, \text{ if } V_M < V_{REL(M-Mo)}\}$.

Examples of this on/off semi-active control philosophy may be found in U.S. Pat. No. 6,115,658 (issued Sep. 5, 2000), entitled "NO-JERK SEMI-ACTIVE SKYHOOK CONTROL METHOD AND APPARATUS" to Ashmadian et al., and U.S. Pat. No. 6,311,110 B1 (issued Oct. 30, 2001), entitled "ADAPTIVE OFF-STATE CONTROL METHOD" to Ivers et al., each of which is hereby incorporated by reference herein in its entirety. The desired force, $F_{des}$, may be rate dependent as in the original implementation of Skyhook control, i.e., $F_{des} = Cv$, where C is the desired damping coefficient. Alternatively, this desired force may be determined through the use of other control theories such as, but not limited to, linear quadratic regulator (LQR) and sliding mode control (SMC). Other vibration control strategies may be implemented.

As recited above, if motion determination module determines that one or any combination of sensors measure motion beyond one or more specified thresholds, then controller 60 may enter a secondary shock control mode. In the shock control mode, a shock mode module (of controller 60) may control the VPEA using any number of control strategies.

In one implementation for example, the VPEA may be adjusted in real-time for optimal combination of occupant body loads and stroking distance to keep the occupant's body loads (e.g., pelvis, spine, neck, etc.) within acceptable limits. As shown in FIG. 6, occupant weight data (e.g., from a manual control, from one or more sensors, or a fixed occupant weight) and/or attitude measurements received as inputs to controller 60 may be utilized to determine load injury thresholds for various parts of the occupant's body (e.g., the pelvis, viscera, spine, neck, and head). The shock mode module 628 (of controller 60) may then determine load injury threshold values for various parts of the occupant's body by utilizing statistical data gathered from a range of body types to determine a correlation between a range of acceptable load limits for each body part and the provided weight value.

Loads should be kept under injury threshold values for all body parts. Generally, because the lumbar spine tends take the brunt of the load, optimizing for the load injury threshold of the lumbar spine tends to be adequate to prevent injury to other body parts. However, in certain instances, other body parts (e.g., head, chest, etc.) may be of primary concern. As such, in various implementations, optimization may focus on just one body part, or on keeping loads under injury threshold values for the most injury-susceptible body part. Other optimization strategies may be implemented.

In one implementation, the shock mode module 628 may, for example, determine a load injury threshold for one or more parts of the occupant's body by utilizing minimum load limits from the range of acceptable load limits corresponding to each body part. The shock mode module may then adjust the VPEA 30 in real-time such that actual loads experienced by one or more of the occupant's body parts are maintained at or below the determined load injury thresholds during the vehicle shock event. This may be accomplished, in one regard, by bringing the actual load experienced by the occupant's body part up to, but not in excess of, the determined load injury thresholds while minimizing stroking distance of the variable profile energy absorber 30.

In making real-time adjustments, via a control signal, the VPEA 30 may be controlled such that the force level is initially high and then lowered as the seat 20 strokes to offset the increasing spring force, thereby maintaining the total force transmitted to the occupant as substantially constant. Another possible operational configuration of the VPEA 30 is that it may be set in its off-state for load transmission levels assuming a preset weight value and preset shock event level. Similarly, the VPEA may be powered continuously, prior to the occurrence of a shock event, to maintain force levels at a preset value, thereby reducing the time required for the system to adjust itself in response to a measured shock event.

In making real-time adjustments, via a control signal, the VPEA 30 may be controlled such that the force level is initially high and then lowers as the seat strokes to offset the increasing spring force, thereby maintaining the total force transmitted to the occupant as substantially constant.

Another possible operational configuration of the VPEA is that it may be set in its off-state for load transmission levels assuming a preset weight value and preset shock event level. Similarly, the VPEA 30 may be powered continuously, prior to the occurrence of a shock event, to maintain force levels at a preset value, thereby reducing the time required for the system to adjust itself in response to a measured shock event. In relation to the types of devices that can be controlled with a magnetic field (e.g., magnetorheological fluid dampers), a permanent magnet may be included in the VPEA 30 to offer the potential for off-state bias operation.

After recognizing through at least one sensor 70a . . . n measurement that a first shock event has occurred, the controller 60 enters recoil/recovery mode to return the VPEA 30 to substantially its initial position. The recoil function returns the VPEA 30 to substantially its initial position after a first shock event quickly enough to perform its function for a subsequent shock event. The recovery function controls the recoil in such a way that the VPEA 30 does not experience an extensional end-stop impact, and so that the system does not oscillate undesirably. For example, as the controller 60 detects the occurrence of a first shock event (from a sensor), the magnitude of a second immediate shock event may be estimated based on prior collected sensor measurement data (e.g., severity of the first shock event). After the stiffness element 50 recovers the VPEA 30 substantially to its initial condition, the controller 60 may communicate with the VPEA 30 via a control signal to mitigate the anticipated transmission of loads to the seat occupant at the predicted second shock level. This sequence may be repeated as needed. Once the occurrence of shock events has ceased, the controller 60 may then return the VPEA 30 to the primary operational mode for vibration isolation.

The controller 60 may detect the occurrence of the first shock event (from a sensor 70a-n), based in part on at least one measurement received that exceeds a predetermined threshold value or other shock indication, and may then enter secondary mode to adjust the VPEA 30 in real-time via a control signal such that the variable profile VPEA 30 force level is initially high, but then lowers as the seat 20 strokes to offset increasing spring force, thereby maintaining the total force transmitted to the occupant low and nearest to constant as possible. With the ability to recover from a first shock event and prepare for a subsequent shock event, it is also a novel attribute of the system that the controller estimates the second immediate shock event is based on prior collected sensor measurement data, by which the VPEA is adjusted, after recovering substantially to its initial condition, to mitigate the transmission of loads to the seat occupant at the predicted shock level. Once the occurrence of shock events has ceased, the controller also has the ability to return to the operational mode for vibration isolation. Thus, the adaptive energy absorption system 100 performs repetitive energy absorption, recoil, and preset operations in response to multiple successive shock events.

According to an alternative implementation, the VPEA 30 may be adjusted in real-time such that the load-stroke profile is optimally controlled to utilize the full stroke capability of the VPEA 30, thereby minimizing loads imparted into the body. In this implementation, real-time environmental measurements may be used to tune the system to the harshness of each particular event. This approach provides an advantage over conventional seat energy absorption systems which tend to be tuned for a fixed shock level (thus, not optimally controlling body loads for other shock levels). For example, in the case of a crashworthy seat for rotorcraft, an FLEA may be tuned for a specific sink rate (e.g., 30 ft/sec). If the actual sink rate was greater than this tuned value (e.g., 50 ft/s), the stroke would have to increase or the system may bottom-out, which may resulting in high loads being imparted into the occupant's spine. Alternatively, if the sink rate was lower than the tuned value (e.g., 15 ft/s), the FLEA will stroke at an unnecessarily high load and would not utilize all of the stroke capability.

A VPEA 30, however, can modify its load-stroke profile to optimize stroke and load imparted into the occupant for each individual shock event, ensuring that the full stroke is safely utilized while imparting the least possible amount of load into the occupant. As such, according to this implementation, the secondary shock mode module may adjust the VPEA 30 in real-time, based on the weight of the occupant and on real-time motion information received as inputs, so that an actual load experienced by a part of the occupant's body is minimized during the vehicle shock event by utilizing substantially an entire stroke of the variable profile energy absorber.

Since what is directly controlled is the load into the vehicle seat, the most efficient use of stroke (S) is to maintain the VPEA 30 just below a seat load (F) that will cause bodily injury. Accordingly, energy absorbed (EA) by the VPEA is given by: EA=F×S.

Therefore for a given amount of energy needing to be absorbed (EA), maintaining the seat load (F) as high as possible without causing bodily injury minimizes the necessary stroke (S). The energy absorbed is dependent upon the shock scenario. For example, for the crash of an aircraft, the energy to be absorbed may be dependent upon the velocity before impact (V) and the mass of the stroking portion of the laden seat (M): EA=1/2×MV$^2$.

According to one aspect of the invention, for example when it may not be possible to measure an occupant's body loads directly, controller 60 may use a biodynamic mathematical model (such as, for example, a lumped parameter model).

FIG. 7 is an exemplary illustration of a control flow diagram for a system (and method) wherein controller 60 comprises a dual mode controller that utilizes a biodynamic model module 622 to estimate body loads/motion. The control flow of FIG. 7 is similar to that of FIG. 6 except that a biodynamic model module 622 is included. Biodynamic data corresponding to injury thresholds, along with other biodynamic data, may be stored in the biodynamic model module 622 (e.g., a look-up table) of controller 60. In some implementations, the stored biodynamic data may comprise statistical data relating to injury criteria (e.g., acceptable load limits or "thresholds")) for a range of body parts for a range of body types, including pelvis, viscera, spine, neck, and head. Other biodynamic data may be stored.

The biodynamic model module 622 may automatically update parameters (e.g., mass, stiffness, damping, distributions, etc.) for the biodynamic model based upon occupant weight (either measured or manually set by weight indication mechanism 62 as described above) to estimate body loads/motion. The output of the biodynamic model module 622 is then provided to vibration mode module 624 and/or shock mode module 628 for processing using the control strategies described above (with regard to FIG. 6) for vibration isolation and shock mitigation.

One example of a biodynamic model that may be utilized with the invention is disclosed in United States Patent Publication No. 20070278057 by Wereley et al. published Dec. 6, 2007, which has been incorporated herein by reference in its entirety. The biodynamic model was described in an article identified as: Choi et al., Mitigation of biodynamic response to vibratory and blast-induced shock loads using magnetorheological seat suspensions, Proceedings of the Institution of Mechanical Engineers, Part D (Journal of Automobile Engineering), June 2005, vol. 219, no. D6, p. 741-53 (Professional Engineering Publishing).

FIG. 8 is an exemplary illustration of a control flow diagram for a system (and method) wherein controller 60 comprises a dual mode controller that utilizes gain scheduling via a gain scheduling module 629 to control the VPEA 30. In this implementation, biodynamic data corresponding to occupant mass, motion, loads, etc. are provided to a gain schedule module 629 (from the biodynamic data module 626). Depending on the real-time vehicle motion information received from the one or more motion sensors (e.g., from one or more sensors (70a, 70b, . . . 70n) in FIG. 1), gain schedule module 629 controls the VPEA 30 (using the control strategies described above) for vibration isolation or shock mitigation.

While the foregoing control strategies (FIGS. 6-8) were described in the context of controller 60 as dual-mode controller, it should be understood that, in alternative implementations, controller 60 may comprise a single-mode controller that may operate only in a mode to mitigate injury to an occupant of vehicle seat 20 when an occurrence of a vehicle shock event (or other extreme motion event) is determined. Any of the foregoing control strategies as described for shock mitigation may be implemented in any such implementations.

Figure 9:
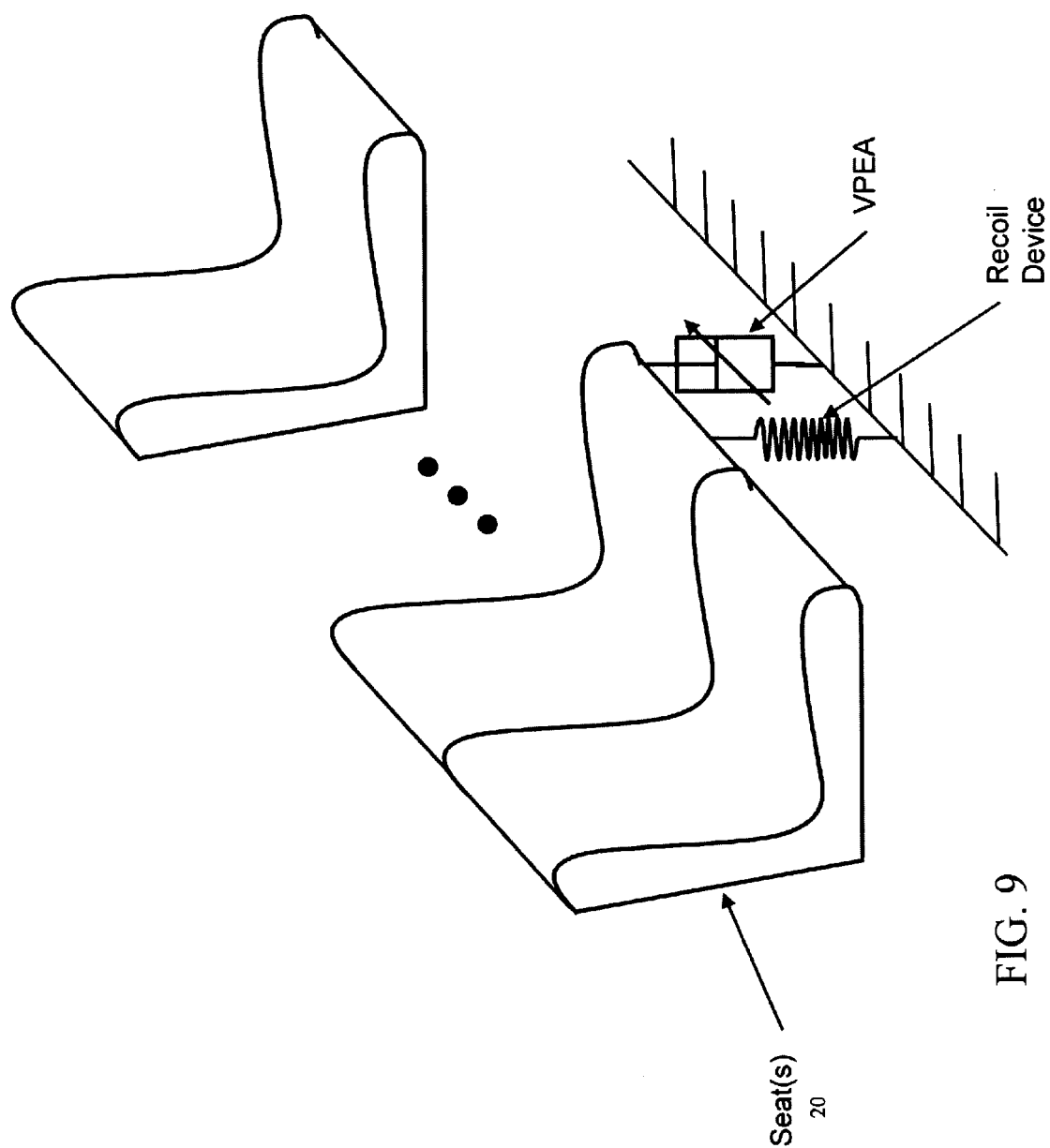
FIG. 9 illustrates an adaptive energy absorption system for a vehicle bench seat.

It will be apparent to those skilled in the art that various modifications and variations can be made in the present invention without departing from the spirit or scope of the invention. For example, as seen in FIG. 9 the seats 20 may be bench seats, or alternatively, bucket seats, platform seats, or any other form of seat. In such a multiple occupant seat case, the system may adapt to the weight of the total occupants in the seat, regardless of the number of occupants (e.g., the multiple occupant seat may have only one occupant or any number up to a fully loaded multiple occupant seat. Thus, it is intended that the present invention covers the modifications and variations of this invention provided they come within the scope of the appended claims and their equivalents.

What is claimed is:

1. A method for mitigating injury to an occupant of a vehicle seat during a vehicle shock event, using a system comprising a variable profile energy absorber operatively connected to the vehicle and to the vehicle seat, a plurality of sensors, and a controller that determines an occurrence of a vehicle shock event and controls said variable profile energy absorber to reduce shock loads transferred to the occupant of the vehicle seat, the method comprising the steps of:
   a. determining a weight of said occupant of said vehicle;
   b. determining an injury threshold level for a specific body part of the occupant of the vehicle based on an acceptable load limit for said body part and said determined weight;
   c. receiving one or more measurements indicating occurrence of a first severe shock event from one or more of said plurality of sensors at said controller;
   d. maintaining injurious loads transferred to said occupant of said vehicle below said injury threshold level by said controller adjusting a load-stroke profile of said adaptive energy absorber in real-time via a control signal.

2. The method according to claim 1, further comprising the step of:
   e. immediately resetting said variable profile energy absorber to its initial starting position in anticipation of a second shock event.

3. The method of claim 1, wherein the specific body part comprises any one of the occupant's pelvis, viscera, spine, neck, or head.

4. A method for reducing vibration and for mitigating injury to an occupant of a vehicle seat during vehicle shock events, using a system comprising a variable profile energy absorber operatively connected to the vehicle and to the vehicle seat, a spring element having a natural resonant frequency operatively connected to a vehicle and to the vehicle seat to maintain vibration of said vehicle seat at said resonant frequency, a plurality of sensors, and a controller that controls said variable profile energy absorber, the method comprising the steps of:
   receiving measurements from said plurality of sensors at said controller;
   said controller monitoring said measurements for occurrence of a severe shock event;
   operating said controller in a first mode in absence of any severe shock event to adjust a load-stroke profile of said adaptive energy absorber in real time to damp the resonant vibration of said vehicle seat established by said spring element;
   and operating said controller in a second mode upon detection of a severe shock event to adjust a load-stroke profile of said adaptive energy absorber in real time to reduce injurious loads transferred to said occupant of said vehicle.

5. The method of claim 4, wherein said step of operating said controller in a second mode further comprises adjusting a load-stroke profile of said adaptive energy absorber in real-time via a control signal maintain an actual load experienced by said vehicle occupant below a predetermined threshold.

6. The method of claim 5, wherein said predetermined threshold comprises an injury threshold level for a specific body part of the occupant of the vehicle.

7. The method of claim 6, wherein said injury threshold level for a specific body part is calculated based on an acceptable load limit for said body part and said weight of said vehicle occupant.

8. The method of claim 7, wherein the specific body part comprises any one of the occupant's pelvis, viscera, spine, neck, or head.

9. The method according to claim 4, further comprising the step of:
   said controller immediately resetting said variable profile energy absorber to its initial starting position in anticipation of a second shock event.

10. The method according to claim 4, further comprising the step of:
    said controller immediately resetting said variable profile energy to operate in the first mode for vibration control.

11. The method according to claim 4, further comprising the step of:
    determining said weight of said vehicle occupant a weight indication mechanism.

12. An adaptive energy absorption system for a vehicle seat for mitigating vibration and low-level shock pulses experienced by an occupant of the vehicle seat during normal vehicle operation, and for mitigating injury to the occupant during one or more high-level shock events, the system comprising:
    a. an energy absorber operatively connected to the vehicle and to the vehicle seat;
    b. a spring element having a natural resonance operatively connected to the vehicle and to the vehicle seat;
    c. a plurality of sensors; and
    d. a controller executing software including a first software module for operating in a vibration control mode until at least one measurement received from one of said plurality of sensors exceeds a predetermined threshold value indicating an occurrence of a severe vehicle shock event, and a second software module for operating in a shock event mode,
    e. wherein, in the first mode, the controller adjusts the energy absorber in real-time via a control signal to offset vibration-induced resonance of said spring element to provide vibration isolation and reduce vibration of the vehicle seat; and
    f. wherein, in the second mode, the controller adjusts in real-time, via a control signal, the variable profile energy absorber, to minimize the shock event force transmitted to the vehicle occupant.

13. The system of claim 12, wherein after said shock event said second software module immediately resets said variable profile energy absorber to its initial starting position in anticipation of a second shock event.

14. The system of claim 12, wherein after said shock event said software returns execution of said first software module.

15. An adaptive energy absorption system for a vehicle seat for mitigating vibration experienced by an occupant of the vehicle seat during normal vehicle operation, and for mitigating injury to the occupant during a vehicle shock event, the system comprising:
    an energy absorber operatively connected to the vehicle and to the vehicle seat;
    a spring element operatively connected to the vehicle and to the vehicle seat;
    a plurality of sensors; and
    a controller in communication with said plurality of sensors, said controller determining a load injury threshold for a part of the occupant's body, and operating in a first mode to adjust the energy absorber in real-time via a control signal to reduce resonance of the vehicle seat, until at least one measurement received from at least one sensor exceeds a predetermined threshold value indicating an occurrence of a vehicle shock event, at which time the controller switches to a second mode for maintaining an actual load experienced by the occupant's body part at or below the determined load injury threshold during the vehicle shock event.

16. The system of claim 15, wherein the spring element comprises a variable spring element.

17. The system of claim 15, wherein the spring element comprises one of a coil spring, leaf spring, torsional spring, or gas spring.

18. The system of claim 15, wherein the energy absorber comprises a magnetorheological (MR) fluid damper.

19. The system of claim 15, wherein the energy absorber comprises a magnetic energy absorber.

20. The system of claim 15, wherein, in the second mode, the controller adjusts the energy absorber so as to bring the actual load experienced by the occupant's body part up to, but not in excess of, the determined load injury threshold while minimizing stroking distance of the energy absorber.

21. The system of claim 15, further comprising a weight sensor in communication with said controller for measuring an occupant weight value.

22. A method for reducing vibration and mitigating injury to an occupant of a vehicle seat during vehicle shock events, using a system comprising a variable profile energy absorber operatively connected to a vehicle and to the vehicle seat, a plurality of sensors, and a controller in communication with said plurality of sensors and said variable profile energy absorber and running software for controlling the variable profile energy absorber, the method comprising the steps of:
receiving at said controller a measurement from at least one of said plurality of sensors;
comparing said measurement to a predetermined threshold at said controller to determine whether said measurement indicates a severe shock event;
when said comparing step indicates no severe shock event, operating said controller in a first mode of operation adapted to adjust said adaptive energy absorber in real time to minimize vibration of said vehicle seat by damping harmonic vibration thereof; and
when said comparing step indicates a severe shock event, operating said controller in a second mode of operation by which said controller adjusts a load/stroke profile of said variable profile energy absorber during said shock event to minimize severity of force transmitted to said vehicle occupant.

23. The method according to claim 22, wherein when said controller is operating in said second mode of operation it adjusts the load/stroke profile of said variable profile energy absorber during said shock event to maintain force transmitted to said vehicle occupant substantially constant over an entire stroke length of said variable profile energy absorber.

24. The method according to claim 22, wherein when said controller is operating in said second mode of operation it adjusts the load/stroke profile of said variable profile energy absorber during said shock event to maintain force transmitted to the vehicle occupant below a predetermined injury threshold.

25. The method of claim 24, wherein said predetermined threshold comprises an injury threshold level for a specific body part of the occupant of the vehicle.

26. The method of claim 25, wherein said injury threshold level for a specific body part is calculated based on an acceptable load limit for said body part and said weight of said vehicle occupant.

27. The method of claim 26, wherein the specific body part comprises any one of the occupant's pelvis, viscera, spine, neck, or head.

28. The method according to claim 22, wherein after said controller adjusts said variable profile energy absorber to minimize severity of transmitted force, said controller immediately resets said variable profile energy absorber to its initial starting position in anticipation of a subsequent shock event.

29. The method according to claim 24, further comprising the step of:
determining a weight of said vehicle occupant by a manual weight indication mechanism.

30. The method according to claim 24, further comprising the step of:
measuring a weight of said vehicle occupant by a weight sensor mounted in said vehicle.

31. The system of claim 12, further comprising a data logger for storing measurements from sensors connected to the controller.

32. The system of claim 31, wherein said data logger is a vehicle event data recorder (EDR) or flight data recorder (FDR) that receives sensor data from said controller.

33. The system of claim 31, wherein said data logger comprises removable memory media for storing sensor measurements.

34. The system of claim 31, wherein said data logger comprises software executable by said controller.

35. The system of claim 31, wherein said sensor measurements logged uniquely identify the occupant.

36. The system of claim 33 further comprising a database for storing and evaluating said sensor measurements.

37. The system of claim 31, wherein said data logger is in communication with said controller.

38. The system of claim 37, wherein controller signals an alarm when it determines that said sensors or data logger have failed.

39. The system of claim 37, wherein controller signals an over-limit alarm when sensor measurement exceeds a pre-determined threshold.

40. The system of claim 31, wherein said data logger can communicate with a remote host computer or device through wired or wireless.

41. The system of claim 31, wherein said controller is in communication with a remote host computer for transmitting a shock event notification signal thereto.

42. The system of claim 31, wherein said controller is in communication with a remote host computer for transmitting a system failure alarm thereto when one of said sensors or data logger fails.

43. The system of claim 31, wherein said controller is in communication with a remote host computer for transmitting an over-limit notification signal thereto when a shock and/or vibration measurement exceeds a pre-determined threshold.

44. The method of claim 1, further comprising a step of logging said one or more measurements.

45. The system of claim 40, further comprising a step of analyzing said logged measurements for health/maintenance purposes including any one or more of exposure dosimetry, mechanical life cycle, or electrical life cycle.

46. The method of claim 1, further comprising a step of logging said one or more received measurements and analyzing said logged measurements to determine if the seat was occupied.

47. The method of claim 1, further comprising analyzing of said logged measurements to determine the weight of the occupant in the seat.

48. A system of claim 31, further comprising an indicator to signal the health/status of system.

49. A system of claim 35, further comprising an indicator to signal the health/status of said identified seated occupant based upon exposure dosimetry.

* * * * *